(12) United States Patent
Vogel (10) Patent No.: US 12,117,564 B2
(45) Date of Patent: Oct. 15, 2024

(54) SCANNING SURVEYING SYSTEM (71) Applicant: Trimble Jena GmbH, Jena (DE)

(72) Inventor: Michael Vogel, Schleifreisen (DE)

(73) Assignee: Trimble Inc., Westminster, CO (US)

( * ) Notice: Subject to any disclaimer, the term of this patent is extended or adjusted under 35 U.S.C. 154(b) by 875 days.

(21) Appl. No.: 17/212,341

(22) Filed: Mar. 25, 2021

(65) Prior Publication Data

US 2021/0389430 A1    Dec. 16, 2021

(30) Foreign Application Priority Data

Jun. 16, 2020  (EP) .................................... 20180273

(51) Int. Cl.
*G01S 7/481*    (2006.01)
*G01S 17/10*    (2020.01)
(Continued)

(52) U.S. Cl.
CPC ............ G01S 7/4817 (2013.01); G01S 17/10 (2013.01); G01S 17/86 (2020.01); G06F 3/04842 (2013.01); G06F 3/0488 (2013.01); G06T 7/521 (2017.01); H04N 23/631 (2023.01); H04N 23/695 (2023.01); H04N 23/90 (2023.01);
(Continued)

(58) Field of Classification Search
CPC ........ G01S 7/4817; G01S 17/10; G01S 17/86; G01S 7/51; G06F 3/04842; G06F 3/0488; G06T 7/521; G06T 2207/10016; G06T 2207/10028; H04N 23/631; H04N 23/695; H04N 23/90; G01C 15/002; G01C 1/04
See application file for complete search history.

(56) References Cited

U.S. PATENT DOCUMENTS

2002/0141001 A1*  10/2002  Hirasawa ................. B41J 2/471
                                                                    358/505
2010/0088910 A1*   4/2010  Svanholm ................ G01C 1/04
                                                                    33/290
(Continued)

FOREIGN PATENT DOCUMENTS

EP    2 728 309 A2    5/2014
EP    3 696 499 A1    8/2020

OTHER PUBLICATIONS

Partial European Search Report for Application No. EP 20 18 0273, mailed Dec. 11, 2020, 19 pages.

(Continued)

*Primary Examiner* — Assres H Woldemaryam
(74) *Attorney, Agent, or Firm* — Kilpatrick Townsend & Stockton LLP (57) ABSTRACT

A scanning surveying system comprises a base 5, an alidade 3 mounted on the base, a first motor 6 to rotate the alidade about a first axis 9, a rotating mirror 21 rotatable about a second axis 16, a second motor 23 to rotate the mirror. An optical distance measuring unit 11 is configured to direct measuring light onto the rotating mirror such that it is reflected towards objects and to receive measuring light back from these objects via the rotating mirror. The system further comprises a camera 81 and a controller for controlling the first motor based on the images recorded by the camera such that the measuring light is reflected from the rotating mirror in a direction corresponding to a selected location within the image.

19 Claims, 3 Drawing Sheets

(51) Int. Cl.
*G01S 17/86* (2020.01)
*G06F 3/04842* (2022.01)
*G06F 3/0488* (2022.01)
*G06T 7/521* (2017.01)
*H04N 23/63* (2023.01)
*H04N 23/695* (2023.01)
*H04N 23/90* (2023.01)

(52) U.S. Cl.
CPC ............... *G06T 2207/10016* (2013.01); *G06T 2207/10028* (2013.01)

(56) References Cited

U.S. PATENT DOCUMENTS

| | | | |
|---|---|---|---|
| 2014/0123508 A1* | 5/2014 | Graesser | G01C 15/002 33/290 |
| 2014/0202012 A1* | 7/2014 | Vogel | G01C 15/00 33/286 |
| 2015/0177508 A1* | 6/2015 | Laabs | G01C 1/02 356/140 |
| 2017/0363421 A1* | 12/2017 | Kumagai | G01C 3/08 |
| 2019/0025410 A1* | 1/2019 | Hoashi | G01S 17/42 |
| 2019/0204423 A1* | 7/2019 | O'Keeffe | G01S 17/89 |
| 2020/0136541 A1* | 4/2020 | Morita | B65H 7/06 |
| 2020/0263985 A1* | 8/2020 | Prudlow | G01S 7/4817 |
| 2020/0264282 A1* | 8/2020 | Vogel | G01S 17/86 |
| 2024/0103139 A1* | 3/2024 | Koehler | G01S 7/51 |

OTHER PUBLICATIONS

Extended European Search Report for Application No. 20 18 0273, mailed Mar. 15, 2021, 18 pages.

\* cited by examiner

SCANNING SURVEYING SYSTEM

CROSS-REFERENCE TO RELATED APPLICATIONS

The present application claims priority to European Patent Application No. EP20180273.3, filed Jun. 16, 2020, the contents of which are incorporated herein by reference in their entirety for all purposes.

FIELD OF INVENTION

The present invention relates to scanning surveying systems having rotating mirrors.

BACKGROUND

A conventional scanning surveying system comprises an optical distance measuring unit generating a beam of measuring light which can be directed to an object. The object reflects or scatters some of the incident measuring light such that the optical distance measuring unit receives measuring light back from the object. The optical distance measuring unit may then determine the distance of the object from the optical distance measuring unit based on, for example, a time-of-flight analysis.

The scanning surveying system further comprises a rotating mirror, wherein the optical distance measuring unit directs the generated beam of measuring light onto the rotating mirror from which the beam is reflected to objects surrounding the scanning surveying system depending on the rotational position of the rotating mirror.

The optical distance measuring unit and the rotating mirror are typically mounted on an alidade which is rotatable relative to a tripod about a vertical axis, and the rotating mirror is typically rotatable about a horizontal axis. By driving the alidade about the vertical axis over a range of 180° at a relatively low speed, driving the rotating mirror at a high speed and performing distance measurements at a very high frequency, it is possible to record distance measurements against a great number of surface points of substantially all objects surrounding the scanning surveying system. The ensemble of measurement data resulting from such scan is referred to as a point cloud in the art. The accuracy of the geometry information relating to the surrounding objects increases with the number of measurements performed per scan. Conventional scanning surveying systems can perform more than one million distance measurements per second so that a scan providing a desirable accuracy can be completed in a few minutes.

It is apparent that the amount of data generated during such scan can be huge. Typically, the point clouds recorded by a scanning surveying system during an excursion are transferred to a powerful computer for off-line processing. With such off-line processing, the recording and the analyzing of the data fall apart and, for example, the surveying engineer making the scan of a site will typically no longer stay at that site when the processing of the recorded data has been completed. If an analysis of the recorded data reveals that some information is missing from the data or that some portions are inaccurate, the scan has to be repeated in an additional excursion of the surveying engineer. It is apparent that the utilizability of high performant scanning surveying systems can still be improved.

Accordingly, it is an object of the present invention to provide a scanning surveying system offering a broader range of applications.

SUMMARY

According to embodiments of the present invention, a scanning surveying system comprises a base, an alidade mounted on the base such that it is rotatable relative to the base about a first axis, a first motor configured to rotate the alidade relative to the base, a rotating mirror mounted on the alidade and rotatable relative to the alidade about a second axis, a second motor configured to rotate the rotating mirror relative to the alidade, and an optical distance measuring unit configured to direct measuring light onto the rotating mirror such that it is reflected towards objects surrounding the scanning surveying system, and to receive measuring light back from these objects via the rotating mirror.

The base can be provided by a tripod, for example. Other configurations for mounting the alidade are possible, however. In some embodiments, it is possible to orient the base such that the first axis is oriented in the vertical direction, i.e. parallel to the direction of gravity at a given measuring site. The second axis can be oriented orthogonal to the first axis. This is not a requirement, however. The optical distance measuring unit is configured to output data representing the distance from the optical distance measuring unit of the object from which the emitted measuring light is received back. For example, the optical distance measuring unit may use a time-of-flight method such that the data representing the distance is determined based on a time difference between the time of emission of a pulse of measuring light from the optical distance measuring unit and a time of receipt by the optical distance measuring unit of measuring light from an object corresponding to the emitted pulse. Other distance measuring techniques, such as phase shift measurements and combinations of time-of-flight and phase shift measurements, can be used by the optical distance measuring unit as well.

According to some embodiments, the scanning surveying system comprises at least one camera configured to record at least one image. The at least one camera can be mounted on the alidade. Herein, the at least one camera can be mounted directly on the alidade, i.e. on a component which is rigidly connected with the alidade, or it can be indirectly mounted on the alidade, i.e. it can be mounted on a component which is itself mounted on the alidade to be movable or rotatable relative to the alidade. However, the mounting of the at least one camera on the alidade results in a rotation of the alidade relative to the base about the first axis results in a corresponding rotation of the at least one camera relative to the base about the first axis.

The camera can be an optical camera detecting visible light such that the camera detects a visible-light image of objects surrounding the scanning surveying system. The camera may also detect light of other spectral ranges then visible light in order to record infrared-light or near-infrared-light images of the objects surrounding the scanning surveying system. The at least one camera may have a two-dimensional image sensor for detecting the image. The two-dimensional image sensor is configured to determine data representing a location in the coordinate system of the image sensor where detected light was incident on the image sensor. The two-dimensional image sensor may include a plurality of pixels. The pixels are detector elements within the two-dimensional image sensor which are configured to detect light which is incident on the detector. The pixels may be arranged in a regular two-dimensional array pattern, for example.

According to some embodiments, the scanning surveying system comprises a controller configured to control the first motor based on the at least one recorded image such that the measuring light is reflected from the rotating mirror in a direction corresponding to a selected location within the image. Herein, the at least one camera can record further, additional images while the controller performs its control of the first motor, and the controller can be configured to control the first motor based on these further additional recorded images which are then used as "live images" to perform accurate control of the first motor.

According to some embodiments, the scanning surveying system comprises a user interface including a display configured to display a representation of the at least one image recorded by the at least one camera to a user, and to receive position data representing the selected location within the recorded image.

The user interface can be of any type allowing interaction of the scanning surveying system and a human user thereof. The display of the user interface can be configured to display information to the user. The display may include displays such as a computer screen, the display of a mobile device, such as a tablet computer or telephone, a head mounted display and other display configurations. The display may include a liquid crystal display, a light-emitting diode display, such as an OLED, AMOLED, QD-LED, and other suitable types.

The position data received by the user interface from the user represents a location within the recorded image. The location may be represented as coordinates of a given pixel in the recorded image in a suitably selected coordinate system of the image, for example.

The user interface can be configured to receive the position data in various ways. For example, the user interface may include a keyboard for the user to enter coordinates representing the position of a selected pixel. Moreover, the user interface may display a cursor, pointer or other indicator representing the selected position on the display itself. The user may move the selected position around on the display by hitting keys of the keyboard or operating a mouse, for example. Moreover, the display may be configured to be touch-sensitive and to detect touch events on the display. For example, coordinates of a position on the touch screen where the touch event was detected can be transformed to coordinates in the coordinate system of the touch screen or the detected image.

According to some embodiments, the at least one camera can be configured to record a still image in response to a user input, and to display the recorded still image on the display. According to other embodiments, the at least one camera is configured to record a sequence of images, and the user interface is configured to display representations of the sequence of images. This may include configurations where live videos recorded by the camera are displayed on the display.

Therefore, the user may identify an object of interest within the image displayed on the display and select the location on the display where the object of interest is displayed. When the user has selected a location within the image, the controller may start to operate the first motor such that the alidade is rotated about the first axis until the beam of measuring light can be directed to the object selected by the user on the display. A distance measurement can then be performed when the beam of measuring light is directed onto the object in order to determine the distance of the object selected by the user from the scanning surveying system.

According to some embodiments, the controller is configured to search the at least one image for a representation of a predefined pattern and to use a position of the searched representation of the predefined pattern within the image as the selected location within the image.

The predefined pattern in the image can be a predefined pattern of a predefined object placed in the surroundings of the scanning surveying system. The predefined object may include a marker applied to an object located in the surroundings of the scanning surveying system. The marker can be applied to the object by an adhesive or other means. The marker provides a pattern which can be identified in the image if the object to which the marker is applied appears in the image. The marker may include patterns, such as a cross, a circle, lines, checkerboard patterns or the like. The controller is configured to recognize the predefined pattern in the recorded image also when the predefined pattern is not orthogonally arranged relative to the scanning distance measuring system by taking a range of possible orientations of the predefined pattern relative to the scanning distance measuring system into account.

Such predefined patterns may indicate reference positions on walls of buildings, for example. Moreover, such predefined pattern can be mounted on a rod, wherein the rod can be carried by a user, and the user may place the tip of the rod on a position of the floor such that the scanning surveying system may measure the distance between the position on the floor and the scanning surveying system when the orientation of the rod relative to the floor and the distance between the predefined pattern and the tip of the rod are known.

According to some embodiments, the controller is configured to record a distance measurement when the measuring light is reflected from the rotating mirror in the direction corresponding to the selected location within the image. The optical distance measuring unit may be configured to generate at least one pulse of the measuring light and to perform a distance measuring using this pulse of the measuring light. In some embodiments herein, the controller is configured to control the second motor such that it rotates continuously at constant speed, and to trigger the generation of the pulse of the measuring light based on the selected location within the recorded image. The controller may then calculate a suitable time for the generation of the pulse of measuring light such that it is directed to the selected object based on the rotation of the rotating mirror at the constant speed. The controller may then trigger the generation of the pulse such that the pulse is emitted at the determined time.

According to other embodiments, the optical distance measuring unit is configured to generate a sequence of pulses of the measuring light and to perform a corresponding sequence of distance measurements using these pulses of measuring light. The sequence of pulses can be generated at a constant rate, for example.

According to some embodiments herein, the controller is configured to control the second motor such that it rotates at a constant rate, and to control a phase of the rotation of the second motor relative to the sequence of the pulses of the measuring light based on the selected location within the recorded image. By controlling such phase, it is possible to direct at least one pulse of measuring light to the selected object, assuming that the speed of the rotating mirror is constant and the rate of the generation of the pulses is constant. Since plural distance measurements are performed during one rotation of the rotating mirror, the controller may then select one or more distance measurements among the plural distance measurements. The selected one or more distance measurements can be the distance measurement corresponding to the pulse directed to the object of interest.

According to some embodiments, the scanning surveying system comprises a mounting structure mounted on the alidade and rotatable relative to the alidade about a third axis, wherein a third motor can be provided to rotate the mounting structure about the third axis. The third axis may substantially coincide with the second axis. According to some embodiments, the at least one camera is mounted on the mounting structure. The controller can be configured to control the third motor in order rotate the mounting structure about the third axis such that the at least one camera can be oriented in various directions about the second axis. The third motor can be operated in situations when an object of interest is not in the field of view of the at least one camera. The mounting structure can then be rotated until the object of interest appears within the field of view of the at least one camera and is displayed on the display.

According to some embodiments, the rotating mirror is mounted on the mounting structure. The rotation of the mounting structure can then be used to adjust the phase of the rotating mirror relative to the pulses generated by the optical distance measuring unit.

According to exemplary embodiments, the scanning surveying system comprises a detector mounted on the alidade such that it can receive measuring light when the rotating mirror is in a predetermined range of rotational positions. The controller is configured to determine locations of incidence of light pulses generated by the optical distance measuring unit on the detector. As illustrated above, each distance measurement is performed in a direction determined by the rotational position of the rotating mirror when the pulse of measuring light is emitted. By determining a location of incidence of a light pulse generated by the optical distance measuring unit at a given time when the rotating mirror is within the range of rotational positions it is possible to determine the dependency between the measuring directions, emission times of the pulses of measuring light and the rotational positions of the rotating mirror. According to exemplary embodiments, the controller is configured to determine locations of incidence of light pulses generated by the optical distance measuring unit on the detector, to trigger a generation of light pulses by the optical distance measuring unit based on the determined locations when performing distance measurements and/or to control the second motor based on the determined locations when performing distance measurements.

Accordingly an embodiment of the invention includes a method of operating a scanning surveying system, wherein the scanning surveying system comprises a base, an alidade mounted on the base and rotatable relative to the base about a first axis, a first motor configured to rotate the alidade relative to the base, a rotating mirror mounted on the alidade and rotatable relative to the alidade about a second axis, a second motor configured to rotate the rotating mirror relative to the alidade, an optical distance measuring unit configured to direct measuring light onto the rotating mirror such that it is reflected towards objects surrounding the scanning surveying system, and to receive measuring light back from these objects via the rotating mirror, and a detector mounted on the alidade to receive measuring light when the rotating mirror is in a predetermined range of rotational positions. The method comprises determining locations of incidence of light pulses generated by the optical distance measuring unit on the detector, triggering a generation of light pulses by the optical distance measuring unit based on the determined locations when performing distance measurements; and/or controlling the second motor based on the determined locations when performing distance measurements.

BRIEF DESCRIPTION OF THE DRAWINGS

Embodiments of the invention will be illustrated with reference to the drawings below. Herein.

DETAILED DESCRIPTION

Figure 1:
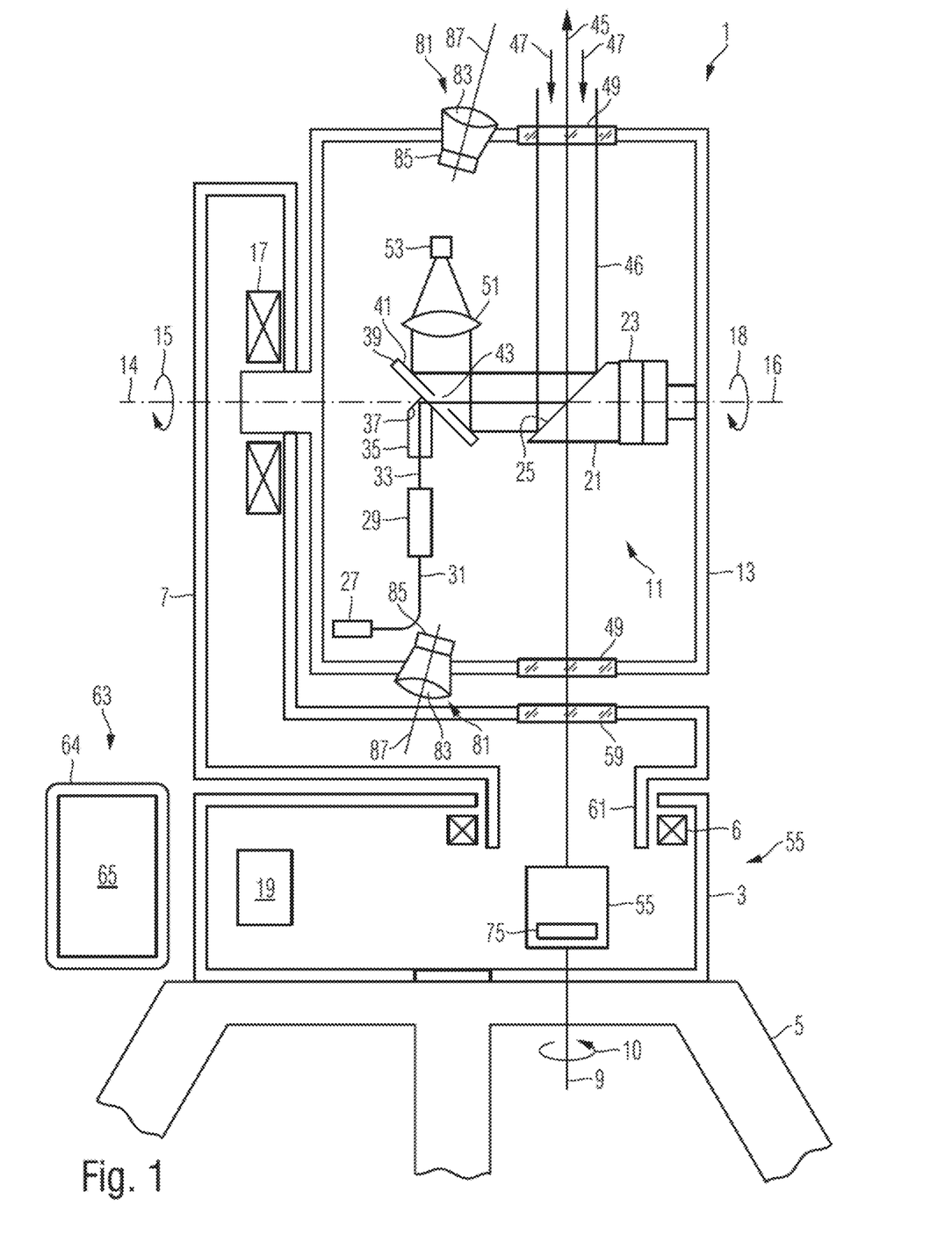
FIG. 1 is a schematic sectional view of a scanning surveying system.

Exemplary scanning surveying systems will be illustrated with reference to FIGS. 1 to 3 below. FIG. 1 is a simplified sectional view schematically illustrating details of a scanning surveying system.

The scanning surveying system 1 comprises a base 3 mounted on a tripod 5, and an alidade 7. The alidade 7 is mounted on the base 3 and can be rotated relative to the base 3 about an axis 9 as indicated by an arrow 10 in FIG. 1. The tripod 5 can be adjusted such that the axis 9 is oriented in the vertical direction when the surveying system 1 is used. A motor 6 is provided to rotate the alidade 7 relative to the base 3. The motor 6 is controlled by a controller 19 mounted within the base 3, or on any other suitable component of the surveying system 1. The surveying system 1 may further comprise a rotational encoder (not shown in FIG. 1) connected to the controller 19 so that the controller 19 can measure the current rotational position of the alidade 7 relative to the base 3.

The surveying system 1 further comprises an optical distance measuring unit 11 mounted on a mounting structure 13. The mounting structure 13 is mounted on the alidade 7 and rotatable relative to the alidade 7 about an axis 14 as indicated by an arrow 15 in FIG. 1. The axis 14 is substantially orthogonal to the axis 9 of rotation of the alidade 7 relative to the base 3. A motor 17 is provided to rotate the mounting structure 13 relative to the alidade 7. The motor 17 is controlled by the controller 19. Moreover, the surveying system 1 may comprise a rotational encoder (not shown in FIG. 1) connected to the controller 19 so that the controller 19 can measure the current rotational position of the mounting structure 13 relative to the alidade 7.

The optical distance measuring unit 11 comprises a rotating mirror 21 carried by a motor 23 mounted on the mounting structure 13. The motor 23 is controlled by the controller 19 and rotates the rotating mirror 21 about an axis 16 of rotation as indicated by an arrow 18 in FIG. 1. The axis 16 of rotation of the mirror substantially coincides with the axis 14 of rotation of the mounting structure 13 relative to the alidade 7. The rotating mirror 21 has a substantially flat mirror surface 25 having a surface normal oriented at an angle of 45 degrees relative to the axis 16 of rotation of the rotating mirror 21.

The measuring unit 11 further comprises a light source 27, such as a laser source, pulsed laser source and/or a fiber laser, for example. The light source 27 is mounted on the mounting structure 13 and configured to generate light pulses which are supplied to an emitting element 29, such as a collimation lens, via a fiber 31. A thin beam 33 of measuring light is emitted from the emitting element 29, enters a glass prism 35 and is reflected from an internal surface 37 of the prism 35 such that it substantially coincides with the axis 16 of rotation of the rotating mirror 21. The beam 33 of measuring light leaves the prism 35 through a glass plate 39. The glass plate 39 has a mirror surface 41 having a surface normal which can be oriented relative to the axis 16 of rotation of the rotating mirror 21 at an angle of 45 degrees, for example. The mirror surface 41 has a central portion 43 traversed by the beam 33 of measuring light. The central portion 43 may carry an antireflective coating such that a low amount of the measuring light is reflected from the mirror surface 41 while the main portion of the beam 33 of measuring light is incident on the mirror surface 25 at an angle of 45 degrees. When the rotating mirror 21 is oriented as shown in FIG. 1, the beam 33 of measuring light is reflected from the mirror surface 25 such that the thin beam 33 of measuring light is emitted from the surveying system 1 in the vertical direction as indicated by an arrow 45 in FIG. 1. This measuring light will be incident on an object, and a portion of that light is scattered by the object or reflected from the object such that it travels back to the surveying system 1 as a broader beam 46 as indicated by arrows 47 in FIG. 1.

The mounting structure 13 comprises one or more windows 49 allowing the beam 33 of measuring light to leave the measuring unit 11 and the light 47 received back from the object to enter the measuring unit 11. The window 49 can be a single ring-shaped window extending around the axis 18 of rotation of the rotating mirror 21.

The light received back from the object is incident on the mirror surface 25 of the rotating mirror 21, and is reflected from the mirror surface 25 to be incident on the mirror 41. Apart from its central portion 43, the mirror surface 41 carries a reflective coating such that most of the light received back from the object is directed towards a focusing lens 51 concentrating the light received back from the object onto a detector 53. Detection signals produced by the detector 53 are supplied to the controller 19. The controller 19 may measure differences between times when light pulses are generated by the light source 27 and corresponding times when these light pulses are detected by the detector 53. These time differences represent the time of flight of a light pulse from the measuring unit to the object and from the object back to the measuring unit 11. This measured time of flight is indicative of the distance of the object from the surveying system 1.

The controller 19 may control the motor 23 to rotate the mirror 21 about the axis 16. This results in the light beam 45 emitted from the surveying system 1 to rotate about the axis 16 in a plane orthogonal to the axis 16. By operating the motor 6 in order to rotate the alidade 7 about the axis 9, the controller 19 may direct the measuring light beam 45 emitted from the surveying system 1 in any direction.

The scanning surveying system 1 further comprises a calibration unit 55 configured to determine properties of the scanning surveying system 1. Details of a calibration unit suitable for integration in the scanning surveying system 1 are illustrated in the co-pending European patent applications of the present applicant with application numbers 19 157 547.1 and 19 157 555.4 filed on Feb. 2, 2019, wherein the whole disclosure of these patent applications is incorporated herein by reference.

The alidade 7 includes a window 59 and a hollow shaft 61 such that the light beam 45 may enter the calibration unit 55, and that calibration light generated by the calibration unit 55 can be directed on components mounted on the alidade 7.

The surveying system 1 further comprises plural cameras 81 mounted on the mounting structure 13. Each camera 81 comprises an objective lens 83 and a position sensitive detector 85 and is configured to record visual images of the surroundings of the surveying system 1. Each camera 81 has a main axis 87 defined by the optical axis of the objective lens 83. The plural cameras 81 differ with respect to the orientations of their main axes 87 relative to the mounting structure 13. The main axes 87 of the plural cameras 81 differ with respect to their orientation in the circumferential direction about the axis 14 and with respect to the azimuthal direction with respect to the axis 14. The cameras 81 can be used to record visual light images of the surroundings of the surveying system simultaneously with the recording of distance measurements using the measuring light beam 45 reflected from the rotating mirror 21, for example.

The scanning surveying system 1 further comprises a graphical user interface 63 formed by a tablet computer 64 having a touch scream 65 in the illustrated embodiment.

The cameras 81 are connected to the controller 19 by a wireless or a wire-based data connection. The controller 19 is configured to obtain image data representing the images recorded by the cameras 81 from the cameras 81. The controller 19 may process the image data using suitable image processing algorithms. For example, the controller 19 may process the images in order to adjust brightness and contrast and to change the image resolution or number of pixels per image.

The controller 19 is further configured to display the images recorded by the cameras 81 on the touch screen 65 by sending the image data to the graphical user interface 63.

Figure 2:
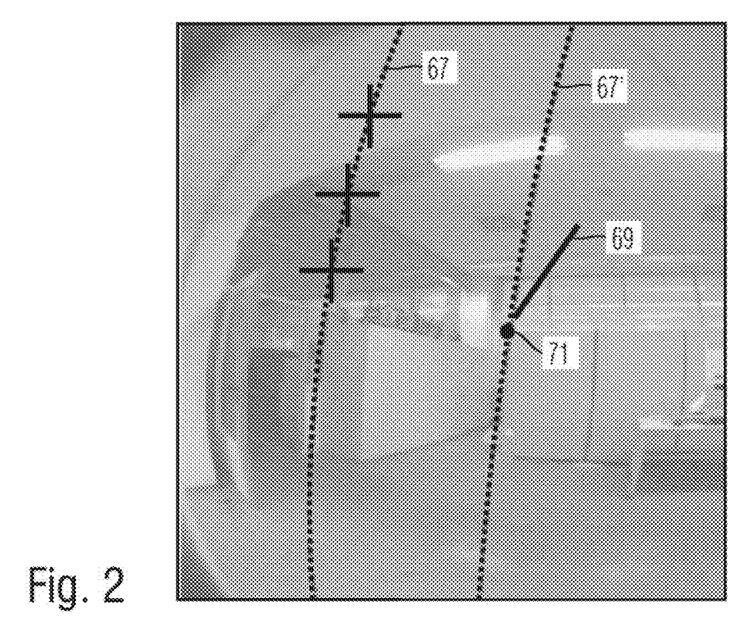
FIG. 2 is an image shown on a graphical user interface of the scanning surveying system of FIG. 1 according to a first embodiment.

FIG. 2 shows an exemplary image displayed on the touch screen 65 of the scanning surveying system 1 according to a specific example. The image has been recorded by one of the cameras 81 and contains objects in the surroundings of the scanning surveying system 1, such as a table, cabinets, a door, and floor, side walls and ceiling of a laboratory room.

Reference numeral 67 in FIG. 2 indicates a dotted line, wherein each dot represents a direction in which a distance measurement can be obtained by the scanning surveying system 1 when the alidade 7 is in the rotational position about the vertical axis 9 where the image was recorded by the camera 81. The dots of the line 67 lie on a plane orthogonal to the axis 14. However, due to the image distortion of the camera 81, the dots of the line 67 appear to lie on a curved line. The dots of the line 67 are spaced apart from each other by a distance defined by the repetition rate of the generation of pulses emitted by the distance measuring unit 11 and the rotational speed of the rotating mirror 21.

FIG. 2 further shows a pen tool 69 displayed by the graphical interface 63 on the touch screen 65. The pen tool 69 can be moved across the touch screen 65 by the user via suitable touch gestures in order to select an object of interest within the image at which the beam of measuring light should be aimed for determining the distance from this object. In the situation shown in FIG. 2, the user has moved the pen tool 69 such that its tip points to the upper left edge corner of one of the cabinets shown in the image. The tip of the pen tool 69 represents a selected position 71 within the image. Herein, the selected position 71 is located at a distance from the dotted line 67, and the object of interest is located away from the plane where distance measurements can be obtained by the scanning surveying system 1 when the alidade 3 is in its current rotational position about the axis 9. In order to perform a distance measurement in the direction corresponding to the selected position 71, the alidade has to be rotated about the axis 9 such that the object of interest is located in the plane where distance measurements can be obtained by the scanning surveying system 1.

Therefore, when the user is satisfied with his selection of an object within the image, he can perform a further gesture instructing the controller 19 to perform the corresponding distance measurement. For this purpose, the controller 19 obtains the selected position 71 represented by the coordinates of the tip of the pen tool 69 within the image displayed on the touch screen 65. For example, the position can be represented by the pixel coordinates (i, j) of the tip of the pen tool 69 in the displaced image.

The position data obtained from the graphical user interface 63 are transformed into direction data by the controller 19 using a suitable transformation. Data representing this transformation can be stored in the controller and may have been obtained by a suitable calibration of the cameras 81 and the motors 6 and 17 and corresponding angular encoders of the scanning surveying system 1. Such calibration may involve recording of images using the cameras 81 and obtaining point clouds of objects also visible in the recorded images, and aligning the image data of the recorded image and the object data of the point cloud by suitable methods. Such methods may include methods of edge detection in both the images recorded by the cameras and the point clouds obtained by the distance measuring unit 11, for example.

Based on such transformation, the controller 19 can determine a direction corresponding to the position of the tip of the pen tool 69 within the image. Based on the analysis of the position within the image, the controller 19 then rotates the alidade 7 about the axis 9 to a new rotational position such that the object of interest is located in the plane where distance measurements can be obtained by the scanning surveying system 1. A new image recorded by the camera when the alidade 3 is in this new rotational position will have a field of view which is displaced relative to that shown in FIG. 2. In this new recorded image, the dotted line 67 indicating the directions in which a distance measurements can be obtained by the scanning surveying system 1 will intersect the representation of the object of interest 71 selected by the user in the new image, as indicated by a line 67' in FIG. 2.

Thereafter, it is possible to obtain a distance measurement for the object positioned around the scanning surveying system 1 corresponding to the position 71 in the image displayed on the user interface 63. However, as mentioned above and as represented by the spaced apart dots of the line 67', it may not be possible to immediately obtain a distance measurement exactly from the object corresponding to the selected position, so that further steps have to be performed by the controller 19 until a distance measurement is obtained exactly from the selected object.

For example, assuming that the distance measuring unit 11 is configured such that the generated pulses of measuring light are generated at a fixed constant rate, the controller 19 may operate the motor 17 to rotate the mounting structure 13 about the axis 14 until one of the spaced apart dots of the line 76 coincides with the selected location 71, or, in other words, until the direction of one of the emitted pulses of measuring light is selected such that the respective pulse hits the selected object. Moreover, the controller may adjust the rotation of the rotating mirror 21 by controlling the motor 23 for the same purpose.

According to other examples, the controller 19 may control the distance measuring unit 11 in order to adjust a phase of the generation period of the pulses relative to the rotation of the scanning mirror 21. For this purpose, the distance measuring unit 11 may adjust the rotation of the scanning mirror 21 or the generation of the pulses of measuring light by the light source 27.

Figure 4:
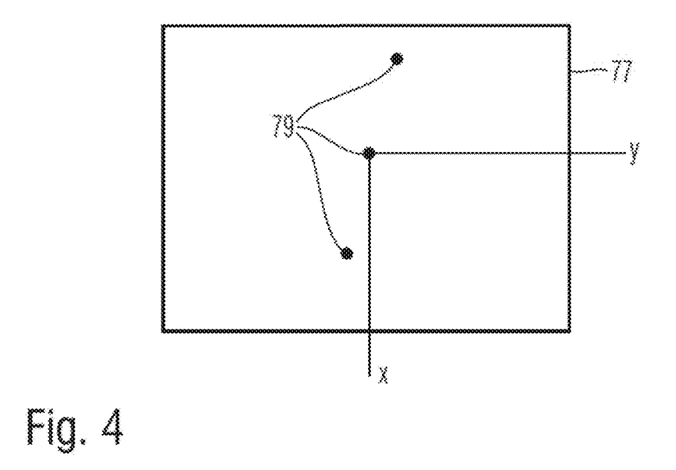
FIG. 4 is an image recorded by a detector mounted on an alidade of the scanning surveying system of FIG. 1.

In order to perform such control of the measurement direction, the correspondence between the rotational positions of the rotating mirror and the emissions of the measuring light pulses must be known. This correspondence may be determined using a detector 75 of the calibration unit 55 mounted on the alidade. FIG. 4 shows an image 77 recorded by the detector 75. A plurality of dots 79 corresponds to a plurality of laser pulses emitted by the light source 27 of the optical distance measuring unit 11 while the rotating mirror 21 was in a predetermined range of rotational positions in which the pulses can be incident on the detector 75. The location (x, y) of each dot 79 within the image 77 can be determined. A direction of the measuring light beam 45 corresponding to each dot 79 can be determined based on the determined location of the respective dot 79 in the image 77 and the known geometry of the detector 75 relative to the optical distance measuring unit 11. When a direction of the beam of measuring light for given pulse can be determined based on the recorded image 77, it is also possible to determine the directions of the measuring light of a pulses emitted later and incident on an object to be measured when the mirror rotates at a known speed.

Subsequent to such adjustment, the controller 19 may select one or more distance measurements from the multitude of distance measurements represented by the dots of line 67' in FIG. 2 as the distance measurements of the object corresponding to the selected location 71. When plural such measurements are selected, they may originate from plural measurements obtained when the beam of measurement light was directed onto the selected object in plural revolutions of the scanning mirror. These plural results can be averaged, for example, in order to improve the accuracy of the distance measurement.

According to a still further examples, the distance measuring unit 11 is configured such that the controller 19 may trigger the emission of a pulse of measuring light. In such situation, the controller 19 may calculate the required time of emission of the pulse such that it is incident on the selected object, and the controller 19 may then determine the time for triggering the pulse based on a time spent between emission of the triggering signal and the emission of the pulse of measuring light.

Figure 3:
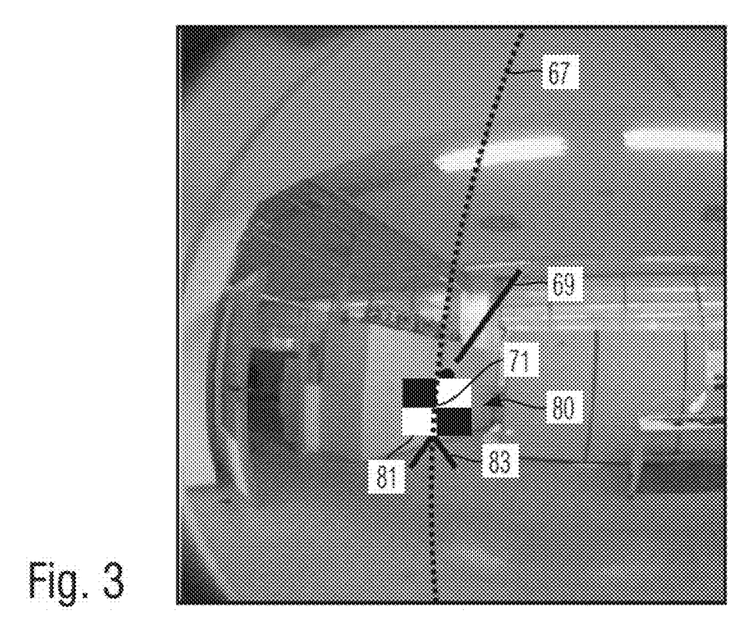
FIG. 3 is an image shown on a graphical user interface of the scanning surveying system of FIG. 1 according to a second embodiment.

FIG. 3 shows an exemplary image displayed on the touch screen 65 of the scanning surveying system according to a further specific example. Similar to FIG. 2, the image has been recorded by one of the cameras 81 and contains objects in the surroundings of the scanning surveying system 1. One of these objects is a marker object 80 mounted on a tripod 83. The marker object 80 comprises a pattern 81 which has two black rectangles and two white rectangles in a checkerboard arrangement. This pattern is a predefined pattern, and the controller 19 is configured to search the recorded image for a representation of the predefined pattern. The controller 19 is further configured to determine a position of the representation of the predefined pattern in the image. In the illustrated example, a center of the four rectangles of the pattern 81 is used as a reference position of the pattern. The controller may determine the position in the recorded image where this reference position of the pattern 81 is located. This determined position is used as the selected position 71 subsequently. As illustrated above, the alidade is then rotated until the dotted line 67 indicating the directions in which a distance measurements can be obtained intersects the selected position 71. It is then possible to measure the distance of the center of the object 80 from the scanning surveying system 1.

The reference object 80 can be placed in the surroundings of the scanning surveying system 1 by the user in order to determine positions of these objects relative to the scanning surveying system 1. For example, the illustrated reference object 80 can be located at a reference point on the floor used for triangulation as usual.

The pen tool 69 is also shown in FIG. 3 and can be used to select one reference object 80 if plural such reference objects are positioned around the scanning surveying system 1 and visible in the image. The controller 19 may then perform the distance measurement against such selected reference object 80.

In the above illustrated embodiments, the light source 27 of the measuring unit 11 is mounted on the mounting structure 13 which is rotatable relative to the alidade 7 about the axis 14. According to other embodiments, the light source generating the measuring light for performing measurements, such as distance measurements, is mounted on the alidade 7. In such embodiments, a shaft supporting the mounting structure 13 on the alidade can be formed as a hollow shaft such that the measuring light generated by the light source outside of the mounting structure may enter the mounting structures by traversing the hollow shaft such that it is incident on the mirror surface 25 of the rotating mirror 21 along the axis 16 of rotation of the rotating mirror 21.

Some embodiments have been described in connection with the accompanying drawing. However, it should be understood that the figure is not drawn to scale. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

For purposes of this disclosure, certain aspects, advantages, and novel features are described herein. It is to be understood that not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Moreover, while illustrative embodiments have been described herein, the scope of any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to the examples described in the present specification or during the prosecution of the application, which examples are to be construed as non-exclusive. Further, the actions of the disclosed processes and methods may be modified in any manner, including by reordering actions and/or inserting additional actions and/or deleting actions. It is intended, therefore, that the specification and examples be considered as illustrative only, with a true scope and spirit being indicated by the claims and their full scope of equivalents.

The invention claimed is:

1. A scanning surveying system, comprising:
a base;
an alidade mounted on the base and rotatable relative to the base about a first axis;
a first motor configured to rotate the alidade relative to the base;
a rotating mirror mounted on the alidade and rotatable relative to the alidade about a second axis;
a second motor configured to rotate the rotating mirror relative to the alidade;
an optical distance measuring unit configured to direct measuring light onto the rotating mirror such that it is reflected towards objects surrounding the scanning surveying system, and to receive measuring light back from these objects via the rotating mirror;
at least one camera configured to record at least one image; and
a controller configured to:
control the first motor to rotate the alidade about the first axis based on a selected location in an image of the at least one recorded image, wherein the alidade is rotated to an orientation such that the selected location is within a measurement plane of the rotating mirror, and
control the optical distance measuring unit to emit a plurality of pulses of the measuring light, wherein the plurality of pulses of the measuring light are reflected from the rotating mirror in a direction corresponding to the measurement plane, and wherein at least one of the plurality of pulses of the measuring light is reflected from the rotating mirror in a direction corresponding to the selected location within the image.

2. The scanning surveying system according to claim 1, further comprising a user interface including a display configured to display a representation of the at least one image recorded by the at least one camera to a user and to receive position data representing the selected location within the recorded image.

3. The scanning surveying system according to claim 2, wherein the user interface provides a movable cursor displayed on the display, and wherein the controller is configured to control the first motor based on a position of the cursor relative to the display.

4. The scanning surveying system according to claim 2, wherein the user interface includes a touch screen, and wherein the controller is configured to control the first motor based on a position of a detected touch event relative to the touch screen.

5. The scanning surveying system according to claim 2, wherein the user interface is part of a mobile device.

6. The scanning surveying system according to claim 2, wherein the at least one camera is configured to record a sequence of images, and wherein the user interface is configured to display representations of the sequence of images.

7. The scanning surveying system according to claim 1, wherein the controller is configured to search the at least one image for a representation of a predefined pattern and to use a position of the searched representation of the predefined pattern within the image as the selected location within the image.

8. The scanning surveying system according to claim 1, wherein the controller is configured to record a distance measurement when the measuring light is reflected from the rotating mirror in the direction corresponding to the selected location within the image.

9. The scanning surveying system according to claim 8, wherein the optical distance measuring unit is configured generate at least one pulse of the measuring light and to perform the distance measurement using this pulse of the measuring light.

10. The scanning surveying system according to claim 9, wherein the controller is configured to control the second motor such that it rotates continuously, and to trigger the generation of the pulse of the measuring light and the performing of the distance measurement based on the selected location within the recorded image.

11. The scanning surveying system according to claim 8, wherein the optical distance measuring unit is configured to generate a sequence of pulses of the measuring light and to perform a corresponding sequence of distance measurements using these pulses of the measuring light.

12. The scanning surveying system according to claim 11, wherein the controller is configured to control the second motor such that it rotates continuously, and to control a phase of the rotation of the second motor relative to the sequence of the pulses of the measuring light based on the selected location within the recorded image.

13. The scanning surveying system according to claim 11, wherein the controller is configured to select one distance measurement among the sequence of the distance measurements based on the selected location within the recorded image.

14. The scanning surveying system according to claim 1, wherein the at least one camera includes a lens imaging the surrounding objects onto a two-dimensional image sensor having a plurality of pixels.

15. The scanning surveying system according to claim 14, further comprising one or more additional cameras, each including a lens, wherein each lens has an optical axis, and wherein the optical axes of the lenses have different orientations relative to the alidade.

16. The scanning surveying system according to claim 1, further comprising a mounting structure mounted on the alidade and rotatable relative to the alidade about a third axis, wherein the at least one camera is mounted on the mounting structure, and a third motor configured to rotate the mounting structure about the third axis.

17. The scanning surveying system according to claim 16, wherein the third axis substantially coincides with the second axis.

18. The scanning surveying system according to claim 16, wherein the rotating mirror is mounted on the mounting structure.

19. The scanning surveying system according to claim 1, further comprising a detector mounted on the alidade, wherein the controller is configured:

to determine locations of incidence of light pulses generated by the optical distance measuring unit on the detector, to trigger a generation of light pulses by the optical distance measuring unit based on the determined locations when performing distance measurements, and to control the second motor based on the determined locations when performing distance measurements.

* * * * *